United States Patent
Chen et al.

(10) Patent No.: US 7,326,332 B2
(45) Date of Patent: Feb. 5, 2008

(54) MULTI COMPONENT CATALYST AND ITS USE IN CATALYTIC CRACKING

(75) Inventors: Tan-Jen Chen, Kingwood, TX (US); John Scott Buchanan, Lambertville, NJ (US); Brian Erik Henry, Baton Rouge, LA (US); Paul F. Keusenkothen, Houston, TX (US); Philip A. Ruziska, Kingwood, TX (US); David L. Stern, Annandale, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 481 days.

(21) Appl. No.: 10/671,080

(22) Filed: Sep. 25, 2003

(65) Prior Publication Data

US 2005/0070422 A1    Mar. 31, 2005

(51) Int. Cl.
*C10G 11/00* (2006.01)
*C10G 11/05* (2006.01)

(52) U.S. Cl. ............... 208/120.01; 208/68; 208/113; 208/114; 502/64; 585/519

(58) Field of Classification Search ............ 208/68, 208/114, 120.01, 113; 585/519; 502/64
See application file for complete search history.

(56) References Cited

U.S. PATENT DOCUMENTS

| | | | |
|---|---|---|---|
| 4,512,875 A | 4/1985 | Long et al. | 208/114 |
| 4,791,083 A | 12/1988 | Pellet et al. | 502/64 |
| 4,988,653 A | 1/1991 | Herbst et al. | 502/67 |
| 4,992,160 A | 2/1991 | Long et al. | 208/111 |
| 4,992,400 A | 2/1991 | Marcilly et al. | 502/67 |
| 5,006,497 A | 4/1991 | Herbst et al. | 502/61 |
| 5,055,176 A * | 10/1991 | Herbst et al. | 208/120.01 |
| 5,098,555 A | 3/1992 | Chitnis et al. | 208/120 |
| 5,472,594 A * | 12/1995 | Tsang et al. | 208/114 |
| 5,888,921 A | 3/1999 | Tsang et al. | 502/64 |
| 5,972,205 A | 10/1999 | Tsang et al. | 208/120.01 |
| 5,981,818 A * | 11/1999 | Purvis et al. | 585/519 |
| 6,093,867 A | 7/2000 | Ladwig et al. | 585/648 |
| 6,306,790 B1 | 10/2001 | Rodriguez et al. | 502/64 |
| 6,388,152 B1 | 5/2002 | Ladwig et al. | 585/330 |
| 2001/0042700 A1* | 11/2001 | Swan et al. | 208/68 |
| 2002/0183192 A1 | 12/2002 | Verduijn et al. | 502/67 |
| 2003/0027710 A1 | 2/2003 | Smith et al. | 502/60 |

FOREIGN PATENT DOCUMENTS

EP    0 708 807    5/1996

* cited by examiner

*Primary Examiner*—Glenn Caldarola
*Assistant Examiner*—Prem C. Singh

(57) ABSTRACT

A multi component catalyst and catalytic cracking process for selectively producing $C_3$ olefins. The catalyst comprises a first molecular sieve having an intermediate pore size, a second molecular sieve and, optionally a third molecular sieve having a large pore size. At least one of the channels of the second molecular sieve has a pore size index that is less than the pore size index of at least one channel of the first molecular sieve. The process is carried out by contacting a feedstock containing hydrocarbons having at least 5 carbon atoms is contacted, under catalytic cracking conditions, with the multi component catalyst. The catalyst finds application in the cracking of naphtha and heavy hydrocarbon feedstocks.

33 Claims, No Drawings

MULTI COMPONENT CATALYST AND ITS USE IN CATALYTIC CRACKING

FIELD OF THE INVENTION

The present invention relates to catalytic cracking of hydrocarbon feedstocks to enhance the yield of propylene.

BACKGROUND TO THE INVENTION

The need for low emissions has created an increased demand for light olefins for use in alkylation, oligomerization, and MTBE and ETBE synthesis processes. In addition, a low cost supply of light olefins, particularly propylene, continues to be in demand as feedstock for polypropylene production.

Light olefins, such as ethylene and propylene, can be produced by thermally cracking naphtha feedstocks containing paraffinic and isoparaffinic compounds, naphthenes and aromatics to produce light olefins. The thermal cracking of naphtha is carried out by exposing naphtha and steam to relatively high temperatures in the tubular coils of a fired heater. A problem associated with this technique is that the process is energy intensive, not very selective, produces coke, and releases significant amounts of carbon dioxide into the air.

Another technique for producing light olefins involves the catalytic cracking of hydrocarbons, such as naphtha. In the catalytic cracking of naphtha, the process is carried out by contacting a naphtha-containing feed with a catalyst usually comprised of one or more crystalline microporous molecular sieves to selectively convert the feed into an olefin-containing mixture. Although various naphtha catalytic cracking processes have been proposed in the past, many of the processes do not produce commercially important light olefins, e.g., propylene, with sufficient selectivity or yield. Also, the processes can produce undesirable amounts of methane and aromatics as unwanted byproducts. In contrast, a practical and economic naphtha catalytic cracking process should selectively produce increased amounts of light olefins, e.g., propylene, while producing minimal amounts of methane and aromatics.

Fluid catalytic cracking (FCC) is routinely used to convert heavy hydrocarbon feedstocks to lighter products, such as gasoline and distillate range fractions. Conventional processes for catalytic cracking of heavy hydrocarbon feedstocks to gasoline and distillate fractions typically use a catalyst containing a large pore molecular sieve, such as zeolite Y, as the primary cracking component and, optionally, an intermediate pore size molecular sieve, such as ZSM-5. While FCC is an efficient process for converting heavier feed to lighter products, many times the process makes less than desirable amounts of light olefins, e.g., propylene.

The present invention provides a catalyst and process for the catalytic cracking of hydrocarbon feedstocks, e.g. naphtha and heavier hydrocarbon feedstocks, which is effective in producing enhanced yields of propylene, as compared with known processes used to crack hydrocarbons.

SUMMARY OF THE INVENTION

In accordance with the present invention, there is provided a catalyst finding particular application in the catalytic cracking of a hydrocarbons, such as naphtha, to selectively produce propylene or as an additive catalyst in combination with a large pore molecular sieve catalyst in the catalytic cracking of heavier hydrocarbon feedstocks. The catalyst comprises a first molecular sieve having an intermediate pore size and a second molecular sieve having a pore size index of at least one of its major channels that is less than the pore size index of at least one of the major channels of the first molecular sieve. When used in the catalytic cracking of heavier hydrocarbon feedstocks, the catalyst comprising the first and second molecular sieves is used in combination with a third molecular sieve having a large pore size.

In another embodiment, the present invention provides a process for catalytically cracking a hydrocarbon feedstock to selectively produce $C_3$ olefins. The process is carried out by contacting a hydrocarbon feedstock containing hydrocarbons having at least 5 carbon atoms under catalytic cracking conditions and in the presence of the catalyst described above.

In one preferred embodiment, the feedstock used in the process comprises a naphtha having a boiling range of about 25° C. to about 225° C.

In a further preferred embodiment, the feedstock used in the process comprises hydrocarbon mixture having an initial boiling point of at least 200° C. and the catalyst comprises first, second, and third molecular sieves.

DETAILED DESCRIPTION OF THE INVENTION

Catalyst

First and Second Molecular Sieves

The first molecular sieve used in the catalyst is an intermediate pore size molecular sieve. Intermediate pore size molecular sieves have a pore size from about 5 Å to about 7 Å and include, for example, ITH, MFI, MEL, MFS MTW, and MWW structure types (IUPAC Commission of Zeolite Nomenclature). These molecular sieves, as well as many other molecular sieves, are described in *Atlas of Zeolite Framework Types*, eds. Ch. Baerlocher, W. H. Meier, and D. H. Olson, Elsevier, Fifth Edition, 2001 (hereinafter referred to "the Atlas"), which is hereby incorporated by reference. Examples of preferred first molecular sieves include ZSM-5, ZSM-11, ZSM-12, ZSM-57, ITQ-13, and MCM-22.

The preferred second molecular sieves include AEL, AFO, CHA, TON, FER, MTT, and MWW structure types (IUPAC Commission of Zeolite Nomenclature). Examples of preferred second molecular sieves include chabazite, ECR-42, ZSM-22, ZSM-35, ZSM-23, MCM-22, MCM-49, SAPO-11, SAPO-34, and SAPO-41. Generally, the second molecular sieve will have an intermediate pore size or small pore size, i.e., pore size from 3 Å to about 5 Å. Usually, the second molecular sieve will have a pore diameter greater than about 3.5 Å to admit $C_{5+}$ molecules into the channels and allow $C_3$ olefins to diffuse out of the channels.

At least one of the channels of the second molecular sieve has a pore size index that is less than the pore size index of at least one channel of the first molecular sieve. The second molecular sieve will have a structure type that is different from the structure type of the first molecular sieve.

As used herein, the expression "channel" or "channels" with respect to the first and second molecular sieves, means the channels formed by the crystalline network of the molecular sieve. These channels allow adsorption of hydrocarbons into the molecular sieve. The expression "channel" or channels does not include other spaces formed by the crystalline network of the molecular sieve spaces that do not allow the adsorption of hydrocarbons.

The expression "pore size index", as used herein, means the product of the dimensions (in Angstrom units) of the two major axes of the pores of the molecular sieve.

The first and second molecular sieves present in the catalyst include molecular sieves having one dimensional, non-interconnecting channels, molecular sieves having two dimensional, non-interconnecting channels, and molecular sieves having three-dimensional, interconnecting channels.

The amount of first molecular sieve and second molecular sieve present in the catalyst will vary over a wide range and thus there are no set ranges. Usually, the relative weight ratio of first molecular sieve to second molecular sieve in the catalyst is between about 0.1:10 to about 10:1. Preferably, the relative weight ratio of first molecular sieve to second molecular sieve will be from about 0.1 to about 10, and, more preferably, between about 0.3 to about 1.0

The average particle size of the crystals of the first and second molecular sieve will vary. Generally the average particle size will be in the range of from about 0.05 to about 5 microns. Preferably, the average particle size will be from about 0.1 to about 3 microns, and, most preferably, the average particle size will be about 0.2 microns.

The expression "average particle size" as used herein, means the arithmetic average of the diameter distribution of the particle on a volume basis.

Technical books and other publications, e.g., the Atlas, give the dimensions of the channels of molecular sieves. The following provides the pore size index of several molecular sieves and includes the method for calculating the pore size index. For example, TON structure type molecular sieves, e.g., ZSM-22, have one-dimensional, non-interconnecting pores. The Atlas describes the channels as 4.6×5.7, which refer to the pore diameter (in Angstroms; two numbers because of non-circular apertures). Multiplying these numbers gives a pore index for TON of 26.22. FER, e.g., ZSM-35, is a molecular sieve having interconnected channels. The Atlas describes one channel as 4.2 Å×5.4 Å and the other channel as 3.5 Å×4.8 Å. Therefore, the pore size index of one channel of FER is 22.68 and the pore size index of the other channel is 16.8. The Atlas describes MTW, e.g., ZSM-22, as having channels of 5.6×6.0. Therefore, the pore size index of MTW is 33.6. U.S. Pat. No. 6,471,941, which is hereby incorporated by reference, describes ITQ-13 as having three sets of channels, i.e., 4.8×5.5 Å, 5.0×5.7 Å, and 4.0×4.9 Å. Therefore, the pore size index of the channels of ITQ-13 is 26.40, 28.5, and 19.6 respectively.

Examples of catalysts with first and second molecular sieves along with the pore size index of the molecular sieves are set forth below in Table I.

TABLE I

| Catalyst | First Molecular Sieve Structure Type/ Exemplary Molecular Sieve | Pore Size Index | Second Molecular Sieve Structure Type/ Exemplary Molecular Sieve | Pore Size Index |
|---|---|---|---|---|
| A | MFI/ZSM-5 | 28.05 and 29.68 | AEL/SAPO-11 | 26.00 |
| B | MEL/ZSM-11 | 28.62 | TON/ZSM-22 | 26.22 |
| C | MTW/ZSM-12 | 33.6 | AFO/SAPO-41 | 30.10 |
| D | MWW/MCM-22 | 22.00 and 20.91 | FER/ZSM-35 | 22.68 and 16.8 |
| E | MFS/ZSM-57 | 27.54 and 15.84 | MWW/MCM-22 | 22.00 and 20.91 |
| F | MEL/ZSM-11 | 28.62 | AEL/ECR-42 | 26.00 |

TABLE I-continued

| Catalyst | First Molecular Sieve Structure Type/ Exemplary Molecular Sieve | Pore Size Index | Second Molecular Sieve Structure Type/ Exemplary Molecular Sieve | Pore Size Index |
|---|---|---|---|---|
| G | MFI/ZSM-5 | 28.05 and 29.68 | CHA/SAPO-34 | 14.44 |
| H | MTW/ZSM-12 | 33.6 | CHA/Chabazite | 14.44 |
| I | MFS/ZSM-57 | 27.54 and 15.84 | MWW/MC-49 | 22.00 and 20.91 |
| J | ITH/ITQ-13 | 26.40, 28.5, and 19.6 | CHA/SAPO-34 | 14.44 |

Preferably, all of the channels of the second molecular sieve have a pore size index that is less than the pore size index of all of the channels of the first molecular sieve. Catalysts A, B, C, F, G, H, and J in Table I are examples of such catalysts.

The framework atoms of the first and second molecular sieves will include at least one element, usually two elements, selected from the group consisting of Si, Al, P, Ge, Ga and Ti.

When the first or second molecular sieve is a zeolitic-type molecular sieve, the molecular sieve will comprise compositions that have the following molar relationship:

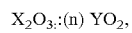
$X_2O_3:(n) YO_2$, wherein X is a trivalent element, such as titanium, boron, aluminum, iron, and/or gallium, Y is a tetravalent element such as silicon, tin, and/or germanium, and n has a value of at least 2, said value being dependent upon the particular type of molecular sieve and the trivalent element present in the molecular sieve.

When the first or second molecular sieve is a zeolitic-type intermediate pore size molecular sieve, the molecular sieve preferably comprises a composition having the following molar relationship:

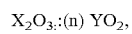
$X_2O_3:(n) YO_2$, wherein X is a trivalent element, such as aluminum, and/or gallium, Y is a tetravalent element such as silicon, tin, and/or germanium; and n has a value greater than 10, said value being dependent upon the particular type of molecular sieve and the trivalent element present in the molecular sieve. When the molecular sieve has a MFI structure, n is preferably greater than 20. When X is aluminum and Y is silicon, the molecular sieve is an aluminosilicate zeolite. When X is gallium and Y is silicon, the molecular sieve is a gallosilicate molecular sieve.

Third Molecular Sieve

A third molecular sieve is preferably present when the catalyst is used to crack heavy hydrocarbons feedstocks, such as those having an initial boiling point of about 200° C. When present, the weight ratio of additive (first and second molecular sieves) to the large pore molecular sieve is usually from about 0.005 to about 50, preferably about 0.01 to about 0.1.

The third molecular sieve is a large pore molecular sieve. Large pore molecular sieves have a pore size greater than about 7 Å. Examples of large pore molecular sieves includes AFI, AFR, LTL, VFI, MAZ, MEI, FAU, EMT, OFF, *BEA, and MOR structure type molecular sieves (IUPAC Commission of Zeolite Nomenclature). Examples of specific large pore molecular sieves, include faujasite, mazzite, offretite, zeolite L, VPI-5, SAPO-37, zeolite X, omega, Beta, ZSM-3, ZSM-4, ZSM-18, ZSM-20, MCM-9, MCM-41, MCM-41S, MCM-48. Additional large pore molecular sieves include zeolite Y (U.S. Pat. No. 3,130,007), Ultrastable Y (USY) (U.S. Pat. No. 3,449,070); Rare Earth exchanged Y (REY) (U.S. Pat. No. 4,415,438); Rare Earth exchanged USY (REUSY), Dealuminated Y (DeAl Y) (U.S. Pat. No. 3,442,792; and Ultrahydrophobic Y (UHPY) (U.S. Pat. No. 4,401,556)

The preferred large pore molecular sieve is zeolite Y, more preferably REY, USY or REUSY.

Catalyst Binder

The cracking catalyst will also normally contain one or more binder materials that are resistant to the temperatures and other conditions e.g., mechanical attrition, which occur during cracking. The binder material may be used to combine all molecular sieves in each catalyst particle. Alternatively, the same or different matrix materials can be used to produce separate particles of each molecular sieve.

The matrix may fulfill both physical and catalytic functions. Matrix materials include active or inactive inorganic materials such as clays, and/or metal oxides such as alumina or silica, titania, zirconia, or magnesia. The metal oxide may be in the form of a sol or a gelatinous precipitate or gel.

Naturally occurring clays that can be employed in the catalyst include the montmorillonite and kaolin families which include the subbentonites, and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, catalyst can include a porous matrix material such as silica-alumina, silica-magnesia, silica-zirconia, silica-thoria, silica-beryllia, silica-titania, as well as ternary materials such as silica-alumina-thoria, silica-alumina-zirconia, silica-alumina-magnesia, silica-magnesia-zirconia. The matrix can be in the form of a cogel. A mixture of these components can also be used.

In general, the relative proportions of molecular sieve component(s) and inorganic oxide binder vary widely, with the molecular sieve content ranging from about 1 to about 90 percent by weight, and more usually from about 20 to about 50 weight percent of the catalyst.

Generally, the catalyst particle size will range from about 10 to 300 microns in diameter, with an average particle diameter of about 60 microns. The surface area of the matrix material will be about $\leq 350$ m$^2$/g, preferably 50 to 200 m$^2$/g, more preferably from about 50 to 100 m$^2$/g. While the surface area of the final catalysts will be dependent on such things as type and amount of molecular sieve used, it will usually be less than about 500 m$^2$/g, preferably from about 50 to 300 m$^2$/g, more preferably from about 50 to 250 m$^2$/g, and most preferably from about 50 to 150 m$^2$/g.

Feedstock

The feedstock employed in the process of the invention comprises one or more hydrocarbons having at least 5 carbon atoms.

In one preferred embodiment, the feedstock comprises a naphtha having a boiling range of about 25° C. to about 225° C. and preferably a boiling range of 25° C. to 125° C. The naphtha can be a thermally cracked or a catalytically cracked naphtha. Such streams can be derived from any appropriate source, for example, they can be derived from the fluid catalytic cracking (FCC) of gas oils and resids, or they can be derived from delayed or fluid coking of resids. It is preferred that the naphtha streams be derived from the fluid catalytic cracking of gas oils and resids. Such naphthas are typically rich in olefins and/or diolefins and relatively lean in paraffins. Feedstreams which are particularly suitable for producing the relatively high $C_2$, $C_3$, and $C_4$ olefin yields contain primarily paraffins and olefins. Preferred feedstreams are those boiling in the naphtha range and containing from about 5 wt. % to about 35 wt. %, preferably from about 10 wt. % to about 30 wt. %, and more preferably from about 10 to 25 wt. % paraffins, and from about 15 wt. %, preferably from about 20 wt. % to about 70 wt. % olefins. The feed may also contain species such as diolefins, naphthenes, aromatics, and mixtures thereof.

In a further preferred embodiment of the invention, the feedstock comprises a hydrocarbon mixture having an initial boiling point of about 200° C. The hydrocarbon feedstock to be cracked may include, in whole or in part, a gas oil (e.g., light, medium, or heavy gas oil) having an initial boiling point above 200° C., a 50% point of at least 260° C. and an end point of at least 315° C. The feedstock may also include vacuum gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 400° C. must be carried out under vacuum in order to avoid thermal cracking. The boiling temperatures utilized herein are expressed for convenience in terms of the boiling point corrected to atmospheric pressure. Resids or deeper cut gas oils with high metals contents can also be cracked using the process of the invention.

Catalytic Cracking Process

The catalytic cracking process of the invention can operate at temperatures from about 200° C. to about 870° C. under reduced, atmospheric or superatmospheric pressure. The catalytic process can be either fixed bed, moving bed or fluidized bed and the hydrocarbon flow may be either concurrent or countercurrent to the catalyst flow. The process of the invention is particularly applicable to the Fluid Catalytic Cracking (FCC) or moving bed processes such as the Thermofor Catalytic Cracking (TCC) processes. The process is also applicable to Propylene Catalytic Cracking (PCC) processes.

The TCC process is a moving bed process wherein the catalyst is in the shape of pellets or beads having an average particle size of about one sixty-fourth to one-fourth inch. Active, hot catalyst beads progress downwardly cocurrent with a hydrocarbon charge stock through a cracking reaction zone. The hydrocarbon products are separated from the coked catalyst and recovered, whereas the coked catalyst is removed from the lower end of the reaction zone and regenerated. Typically TCC conversion conditions include an average reactor temperature of about 450° C. to about 510° C.; catalyst/oil volume ratio of about 2 to about 7; reactor space velocity of about 1 to about 2.5 vol./hr./vol.; and recycle to fresh feed ratio of 0 to about 0.5 (volume).

The process of the invention is particularly applicable to fluid catalytic cracking (FCC), in which the cracking catalyst is typically a fine powder with a particle size of about 10 to 200 microns. This powder is generally suspended in the feed and propelled upward in a reaction zone. A relatively heavy hydrocarbon feedstock, e.g., a gas oil, is admixed with the cracking catalyst to provide a fluidized suspension and cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbons from the spent catalyst prior to conveying the latter to a catalyst regenerator unit, an inert stripping gas, e.g., steam, is passed through the catalyst bed where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

Typically, FCC conversion conditions include a riser top temperature of about 500° C. to about 650° C., preferably from about 500° C. to about 600° C., and most preferably from about 500° C. to about 550° C.; catalyst/oil weight ratio of about 3 to about 12, preferably about 4 to about 11, and most preferably about 5 to about 10; and catalyst residence time of about 0.1 to about 15 seconds, preferably about 0.2 to about 10 seconds.

The process of the invention is particularly applicable to propylene catalytic cracking (PCC) processes. Typical PCC conversion conditions include temperatures from about 400° C. to about 700° C., preferably from about 525° C. to 600° C., hydrocarbon partial pressures from about 10 to 50 psia, preferably from about 20 to 40 psia; and a catalyst to naphtha (wt/wt) ratio from about 3 to 12, preferably from about 4 to 10, where catalyst weight is total weight of the catalyst composite. It is also preferred that steam be concurrently introduced with the naphtha stream into the reaction zone, with the steam comprising up to about 50 wt. % of the hydrocarbon feed. Also, it is preferred that the naphtha residence time in the reaction zone be less than about 10 seconds, for example from about 0.1 to 10 seconds. The above conditions will be such that at least about 60 wt. % of the $C_{5+}$ olefins in the naphtha stream are converted to $C_{4-}$ products and less than about 25 wt. %, preferably less than about 20 wt. % of the paraffins are converted to $C_{4-}$ products, and that propylene comprises at least about 90 mol %, preferably greater than about 95 mol % of the total $C_3$ reaction products with the weight ratio of propylene/total $C_{2-}$ products greater than about 3.5. It is also preferred that ethylene comprises at least about 90 mol % of the $C_2$ products, with the weight ratio of propylene:ethylene being greater than about 4, and that the "full range" $C_{5+}$ naphtha product is enhanced in both motor and research octanes relative to the naphtha feed. It is within the scope of this invention that the catalysts be precoked prior to introduction of feed in order to further improve the selectivity to propylene. It is also within the scope of this invention that an effective amount of single ring aromatics be fed to the reaction zone to also improve the selectivity of propylene vs. ethylene. The aromatics may be from an external source such as a reforming process unit or they may consist of heavy naphtha recycle product from the instant process.

Preferably, the PCC process is carried out to produce propylene in a propylene to ethylene ratio of at least 4:1 and a propylene to butylene ratio of at least 1:1.

The invention is illustrated by the following non-limiting example.

EXAMPLE

A series of tests were carried out to demonstrate the effectiveness of the multi component catalyst for catalytic conversion of naphtha to propylene. Catalysts containing ZSM-5 or SAPO-11 were tested against a multi component catalyst comprised of ZSM-5 and SAPO-11. The weight ratio of ZSM-5 to SAPO-11 in the multi component catalyst was 1:2. The feed used in the tests was full range naphtha. The reactor temperature was 500° C. and the weight hourly space velocity was 144 $hr^{-1}$. The results of the tests are shown below in Table II. The expected data shown in Table II is based on linear interpolation of the results of the catalyst containing SAPO-11 and the catalyst containing ZSM-5.

TABLE II

| | Catalyst | | | |
|---|---|---|---|---|
| | ZSM-5 | SAPO-11 | ZSM-5/SAPO-11 Expected | ZSM-5/SAPO-11 Actual |
| $C_4$ Conversion, Wt. % | 20.7 | 15.5 | 17.2 | 24.2 |
| Key Results, Wt. % | | | | |
| Ethylene | 1.0 | 0.6 | 0.7 | 1.2 |
| Propylene | 10.6 | 8.7 | 9.3 | 13.1 |
| Butenes | 8.6 | 5.7 | 6.6 | 9.2 |
| Light Saturates | 0.5 | 0.6 | 0.6 | 0.7 |
| Propane | 0.1 | 0.1 | 0.1 | 0.1 |
| Selectivity, % | | | | |
| Propylene | 51.2 | 55.8 | 54.3 | 54.1 |

The data in Table II shows higher $C_{4-}$ conversion (24.2 versus 17.2 weight percent) using the ZSM-5/SAPO-11 catalyst. The data also shows higher the propylene conversion (13.1 versus 10.6 weight percent) for the ZSM-5/SAPO-11 catalyst.

What is claimed is:

1. A catalytic cracking process for selectively producing $C_3$ olefins, said process comprising contacting under catalytic cracking conditions, a feedstock containing hydrocarbons having at least 5 carbon atoms with a catalytic cracking catalyst comprising catalytically effective amounts of a multicomponent catalyst comprising:
   (a) a first molecular sieve component having an intermediate pore size; and
   (b) a second molecular sieve component having a structure type that is different from said first molecular sieve and a pore size index of at least one channel of said second molecular sieve which is less than the pore size index of at least one channel of said first molecular sieve; and
   wherein said multicomponent catalyst provides recovering a higher propylene conversion, by weight percent, than with either said first component or said second component alone.

2. The process recited in claim 1, wherein said feedstock comprises a naphtha having a boiling range of 25° C. to 225° C.

3. The process recited in claim 2, wherein the second molecular sieve has a pore diameter greater than about 3.5 Å.

4. The process recited in claim 2, wherein all of the channels of the second molecular sieve have a pore size index that is less than the pore size index of all of the channels of the first molecular sieve.

5. The process recited in claim 2, wherein said first molecular sieve and said second molecular sieve have one dimensional, non-interconnecting channels.

6. The process recited in claim 2, wherein said first molecular sieve, said second molecular sieve, or both have three-dimensional, interconnecting channels.

7. The process recited in claim 2, wherein said first molecular sieve has a structure selected from the group consisting of ITH, MFI, MEL, MFS MTW, and MWW.

8. The process recited in claim 7, wherein said first molecular sieve is selected from the group consisting of ZSM-5, ZSM-11, ZSM-12, ZSM-57, ITQ-13, and MCM-22.

9. The process recited in claim 7, wherein said second molecular sieve has a structure selected from the group consisting of AEL, AFO, CHA, TON, FER, MTT, and MWW.

10. The process recited in claim 8, wherein said second molecular sieve is selected from the group consisting ECR-42, ZSM-22, ZSM-35, ZSM-23, MCM-22, MCM-49, SAPO-11, SAPO-34, and SAPO-41.

11. The process recited in claim 2, wherein said first molecular sieve is ZSM-5 and said second molecular sieve is SAPO-11.

12. The process recited in claim 11, wherein said naphtha is a thermally or catalytically cracked naphtha boiling in the naphtha range and containing from about 5 wt. % to about 35 wt. % paraffins, and from about 15 wt. % to about 70 wt. % olefins.

13. The process recited in claim 3, wherein the catalytic cracking conditions include a feed residence time in the reaction zone of less than about 10 seconds, temperatures ranging from about 400° C. to about 700° C.; hydrocarbon partial pressures from about 10 to 50 psia; and a catalyst to feed (wt/wt) ratio from about 3 to 12; wherein catalyst weight is total weight of said catalytic cracking catalyst composite.

14. The process recited in claim 1, wherein the feedstock comprises a hydrocarbon mixture having an initial boiling point of 200° C. and said catalytic cracking composition further comprises a third molecular sieve having a large pore size.

15. The process recited in claim 14, wherein all of the channels of the second molecular sieve have a pore size index that is less than the pore size index of all of the channels of the first molecular sieve.

16. The process recited in claim 14, wherein said first molecular sieve and said second molecular sieve have one dimensional, non-interconnecting channels.

17. The process recited in claim 14, wherein said first molecular sieve, said second molecular sieve, or both have three-dimensional, interconnecting channels.

18. The process recited in claim 14, wherein said third molecular sieve has a structure selected from the group consisting of AFI, AFR, LTL, VFI, MAZ, MEI, FAU, EMT, OFF, *BEA, and MOR.

19. The process recited in claim 14, wherein said first molecular sieve has a structure selected from the group consisting of ITH, MFI, MEL, MFS MTW, and MWW.

20. The process recited in claim 19, wherein said first molecular sieve is selected from the group consisting of ZSM-5, ZSM-11, ZSM-12, ZSM-57, ITQ-13, and MCM-22.

21. The process recited in claim 19, wherein said second molecular sieve has a structure selected from the group consisting of AEL, AFO, CHA, TON, FER, MTT, and MWW.

22. The process recited in claim 19, wherein said second molecular sieve is selected from the group consisting ECR-42, ZSM-22, ZSM-35, ZSM-23, MCM-22, MCM-49, SAPO-11, SAPO-34, and SAPO-41.

23. The process recited in claim 14, wherein said first molecular sieve is ZSM-5 and said second molecular sieve is SAPO-11.

24. The process recited in claim 21, wherein said third molecular sieve has a structure selected from the group consisting of AFI, AFR, LTL, VFI, MAZ, MEI, FAU, EMT, OFF, *BEA, and MOR.

25. The process recited in claim 22, wherein said third molecular sieve is selected from the group consisting of faujasite, mazzite, offretite, zeolite L, VPI-5, SAPO-37, zeolite X, omega, Beta, ZSM-3, ZSM-4, ZSM-18, ZSM-20, MCM-9, MCM-41, MCM-41S, MCM-48, zeolite Y, Ultrastable Y, Rare Earth exchanged Y, Rare Earth exchanged USY, Dealuminated Y, and Ultrahydrophobic Y.

26. The process of claim 25, wherein said large pore molecular sieve is selected from the group consisting of REY, USY or REUSY.

27. The process of claim 26, wherein said hydrocarbon mixture has an initial boiling point above 200° C., a 50% point of at least 260° C. and an end point of at least 315° C.

28. The process of claim 27, wherein said hydrocarbon mixture is selected from the group consisting of vacuum gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, and hydrotreated products of the foregoing.

29. The process of claim 26, wherein the weight ratio of said third molecular sieve to the first and second molecular sieve is about 0.01 to about 0.1.

30. The process of claim 23, wherein said large pore molecular sieve comprises a zeolite Y.

31. The process recited in claim 23, wherein the product of said catalytic cracking process contains at least 5 percent by weight of C3 olefins based on the total weight of the propylene and butylene produced by the process.

32. The process recited in claim 23, wherein said process is carried out to produce propylene in a propylene to ethylene ratio of at least 4:1 and a propylene to butylene ratio of at least 1:1.

33. The process recited in claim 32, further comprising the steps of:
(a) separating the propylene; and
(b) polymerizing or co-polymerizing the separated propylene.

* * * * *